(12) United States Patent
Fitzpatrick et al.

(10) Patent No.: US 9,975,394 B2
(45) Date of Patent: May 22, 2018

(54) AIRFLOW MANAGEMENT SYSTEM FOR VEHICLE SEAT

(71) Applicant: Faurecia Automotive Seating, LLC, Troy, MI (US)

(72) Inventors: Robert C. Fitzpatrick, Holland, MI (US); James T. Hotary, Holland, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 1029 days.

(21) Appl. No.: 13/722,156

(22) Filed: Dec. 20, 2012

(65) Prior Publication Data
US 2013/0165033 A1 Jun. 27, 2013

Related U.S. Application Data

(60) Provisional application No. 61/579,814, filed on Dec. 23, 2011.

(51) Int. Cl.
*B60H 1/00* (2006.01)
*B60N 2/56* (2006.01)

(52) U.S. Cl.
CPC ....... *B60H 1/00285* (2013.01); *B60N 2/5657* (2013.01); *B60N 2/5671* (2013.01); *B60N 2/5685* (2013.01); *B60N 2/5692* (2013.01)

(58) Field of Classification Search
CPC .. B60N 2/5657; B60N 2/5635; B60N 2/5628; B60N 2/5671; B60N 2/5685;
(Continued)

(56) References Cited

U.S. PATENT DOCUMENTS 5,450,894 A * 9/1995 Inoue ................. B60H 1/00285
165/43
5,924,766 A * 7/1999 Esaki ...................... A47C 7/74
297/180.13
(Continued)

FOREIGN PATENT DOCUMENTS

DE 19607110 A1 8/1997
DE 102007031322 B3 10/2008
WO WO91/12150 8/1991

OTHER PUBLICATIONS

European Search Report for corresponding application No. EP 12 19 9313, dated Mar. 25, 2013, 2 pages.
(Continued)

*Primary Examiner* — Gregory Huson
*Assistant Examiner* — Dana Tighe
(74) *Attorney, Agent, or Firm* — Reising Ethington P.C.

(57) ABSTRACT

Vehicle seats may be configured as part of an airflow management system capable of controlling the environment in the immediate vicinity of seated passengers. A vehicle seat may include any number of air intake and discharge ports arranged so that discharged air flows along the body of the seated passenger on its way to the air intake ports. The air may be heated and/or cooled along a system air flow path to have an immediate effect on the comfort of the seated passenger without the need to heat or cool the entire vehicle cabin. Less energy is consumed to achieve a vehicle seat-specific climate than to achieve an overall interior cabin climate. The airflow management system may include more than one such vehicle seat, and the airflow characteristics with respect to each vehicle seat may be separately controllable.

20 Claims, 3 Drawing Sheets

(58) Field of Classification Search
CPC ...... B60N 2/5621; B60N 2/5642; B60N 2/56; B60N 2/565; B60N 2/5692; B60N 2/4876; B60N 2/5678; B60H 1/00285
USPC .......................................................... 454/120
See application file for complete search history.

(56) References Cited

U.S. PATENT DOCUMENTS

| | | | | |
|---|---|---|---|---|
| 6,059,018 | A * | 5/2000 | Yoshinori | B60H 1/00285 165/41 |
| 6,644,735 | B2 * | 11/2003 | Bargheer | B60H 1/00285 297/180.13 |
| 2004/0195870 | A1 * | 10/2004 | Bohlender | B60N 2/56 297/180.1 |
| 2006/0273646 | A1 * | 12/2006 | Comiskey | A47C 7/74 297/408 |
| 2007/0234742 | A1 * | 10/2007 | Aoki | B60H 1/00285 62/3.3 |
| 2010/0038937 | A1 * | 2/2010 | Andersson | B60N 2/5635 297/180.14 |
| 2012/0013153 | A1 * | 1/2012 | Chang | B60N 2/5635 297/180.1 |

OTHER PUBLICATIONS

Chinese Office Action with English summary for CN application No. 201210567494.2, dated Jul. 22, 2016, 9 pages.

* cited by examiner

AIRFLOW MANAGEMENT SYSTEM FOR VEHICLE SEAT

This application claims the benefit of U.S. Provisional Patent Application No. 61/579,814 filed Dec. 23, 2011, the entire contents of which are hereby incorporated by reference.

TECHNICAL FIELD

The present disclosure relates generally to vehicle seating assemblies and, more particularly, to management of airflow with respect to vehicle seating assemblies.

BACKGROUND

Vehicle climate control systems are typically sized and configured to heat and/or cool the passenger cabin to an overall average temperature selected by the vehicle occupant. These types of systems may rely on user-adjustable grates or vents built into the vehicle instrument panel to direct forced air from the climate control system in the desired direction, such as toward a vehicle occupant who desires a warmer or cooler environment and/or away from a vehicle occupant who does not want a warmer or cooler environment. Oftentimes when the interior of the passenger cabin is at an average temperature relatively far from the desired temperature, such as on a hot summer or cold winter day, the vehicle occupant(s) must wait until these climate control systems begin heating or cooling the entire volume of air in the cabin before feeling any relief in their immediate vicinity.

WO 91/12150 discloses an air conditioning system for use in the cabin of a construction machine or the like. The system includes an integral heating and air conditioning unit located in the cabin behind the seated passenger, with duct work extending from the unit and along the sides of the cabin. The system includes a seat assembly with a ventilation hole that extends through the seat and the back rest with a small fan disposed in the hole. The system appears to increase overall air circulation within the cabin and to direct forced air from grates located alongside the seated passenger. The system also provides for air flow through the ventilation hole in the seat assembly, taking air from the cabin into the seat and expelling the air from the top of the back rest.

SUMMARY

In accordance with one embodiment, a vehicle seat includes a seat bottom adapted for mounting to a vehicle frame and a seat back coupled to the seat bottom. The vehicle seat further includes a pair of air discharge ports. Each of the discharge ports is in fluid communication with a positive pressure air source and located along opposite sides of the seat and of a seated passenger. The vehicle seat further includes an air intake port in fluid communication with a negative pressure source. The air intake port is located so that air discharged from the pair of air discharge ports flows over a portion of the seated passenger and into the air intake port.

In another embodiment, the pair of air discharge ports is located along the seat bottom.

In another embodiment, the air intake port is located along a front portion of the seat bottom so that air flows along the legs of the seated passenger. The vehicle seat further includes a pair of air intake ports located along opposite sides of the seat back so that air flows along the torso of the seated passenger.

In another embodiment, the vehicle seat includes another pair of air discharge ports located along opposite sides of the seat back and of the seated passenger.

In another embodiment, the vehicle seat includes a third pair of air discharge ports located along opposite sides of the seat back and of the seated passenger.

In another embodiment, the seat back includes a headrest and one of the pairs of air discharge ports is located along the headrest.

In another embodiment, the pair of air discharge ports is located along the seat back.

In accordance with another embodiment, an airflow management system for use in a vehicle includes a vehicle seat having air intake ports located along opposite sides of the seat and of a seated passenger, and air discharge ports located along opposite sides of the seat and of the seated passenger. The system further includes a blower having an output side arranged to provide air flow out of the air discharge ports, and a controller adapted to control the blower.

In another embodiment, the blower has an input side arranged to draw air into the air intake ports.

In another embodiment, the airflow management system further includes one or more heat exchangers located along a system air flow path to affect the temperature of the air flowing through the system.

In another embodiment, the one or more heat exchangers includes an air-cooling unit and an air-heating unit.

In another embodiment, the controller is adapted to receive information corresponding to the desired system airflow characteristics and to control the one or more heat exchangers to achieve said airflow characteristics.

In another embodiment, the controller is adapted to receive user input from a user interface that is part of the vehicle.

In another embodiment, the controller is adapted to receive user input from a user interface that is separate from the vehicle.

In another embodiment, the airflow management system further includes a second vehicle seat having air intake ports located on opposite sides of the second seat and of a second seated passenger, and air discharge ports located on opposite sides of the second seat and of the second seated passenger. Airflow through the ports of the second vehicle seat is separately controllable from the airflow through the ports of the other vehicle seat.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments, except where there is incompatibility of features.

DESCRIPTION OF THE DRAWINGS

One or more embodiments will hereinafter be described in conjunction with the appended drawings, wherein like designations denote like elements, and wherein.

DETAILED DESCRIPTION OF
EMBODIMENT(S)

Vehicle seats may be configured as part of an airflow management system that is capable of controlling the environment in the immediate vicinity of one or more seated passengers. Each vehicle seat may include any number of air intake and air discharge ports arranged so that air discharged from the discharge port(s) flows along the body of the seated passenger on its way to the air intake port(s). The air may be heated and/or cooled along an air flow path to have an immediate effect on the comfort of the passenger without the need to heat and/or cool the entire vehicle cabin. The airflow management system may include more than one vehicle seat with air intake and discharge ports, and the airflow characteristics with respect to each vehicle seat may be separately controllable to achieve a vehicle seat-specific climate.

Figures 1, 2:
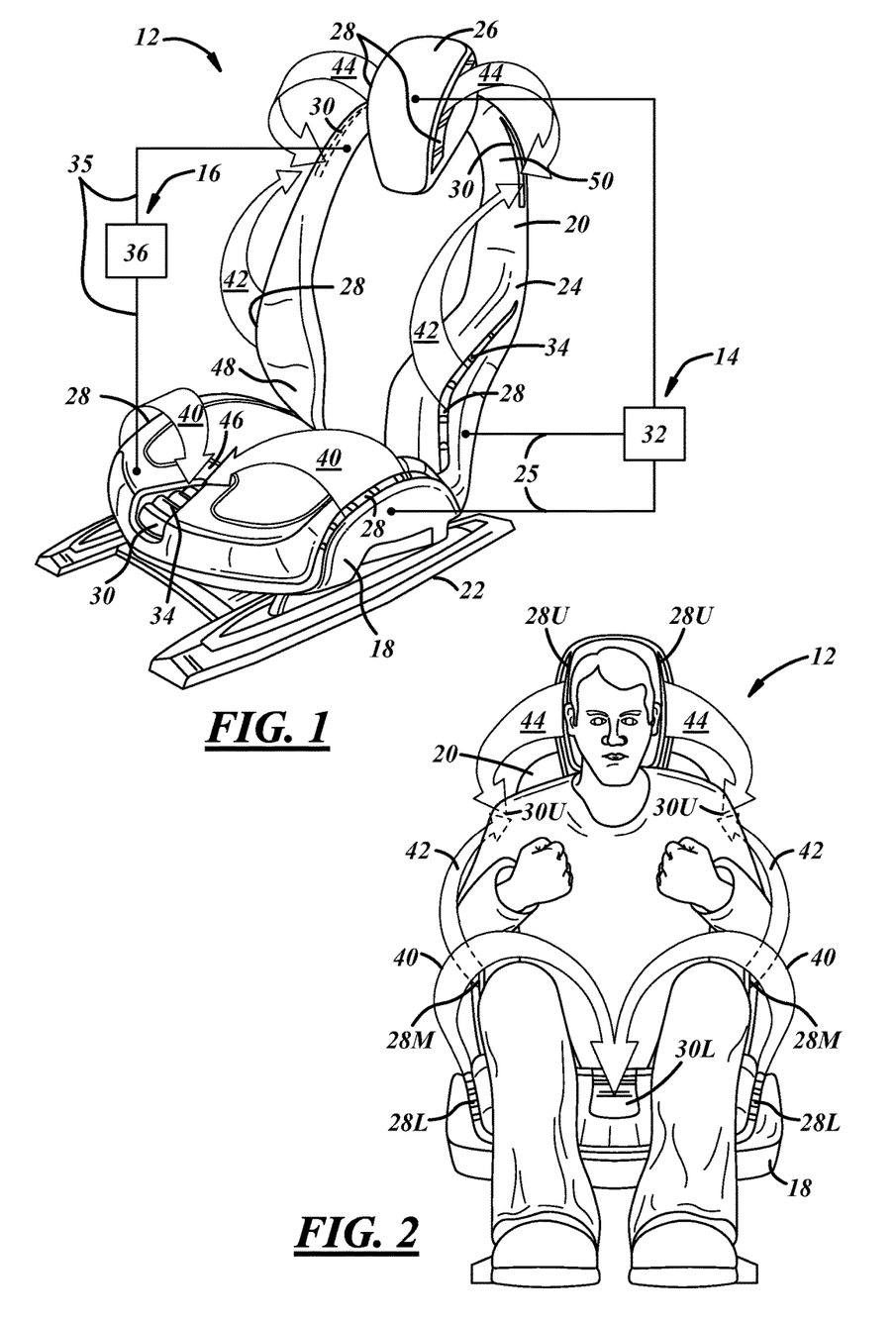
FIG. 1 is a perspective view of one embodiment of a vehicle seat.
FIG. 2 is a front view of the vehicle seat of FIG. 1, shown with a seated passenger.
Figures 3, 4:
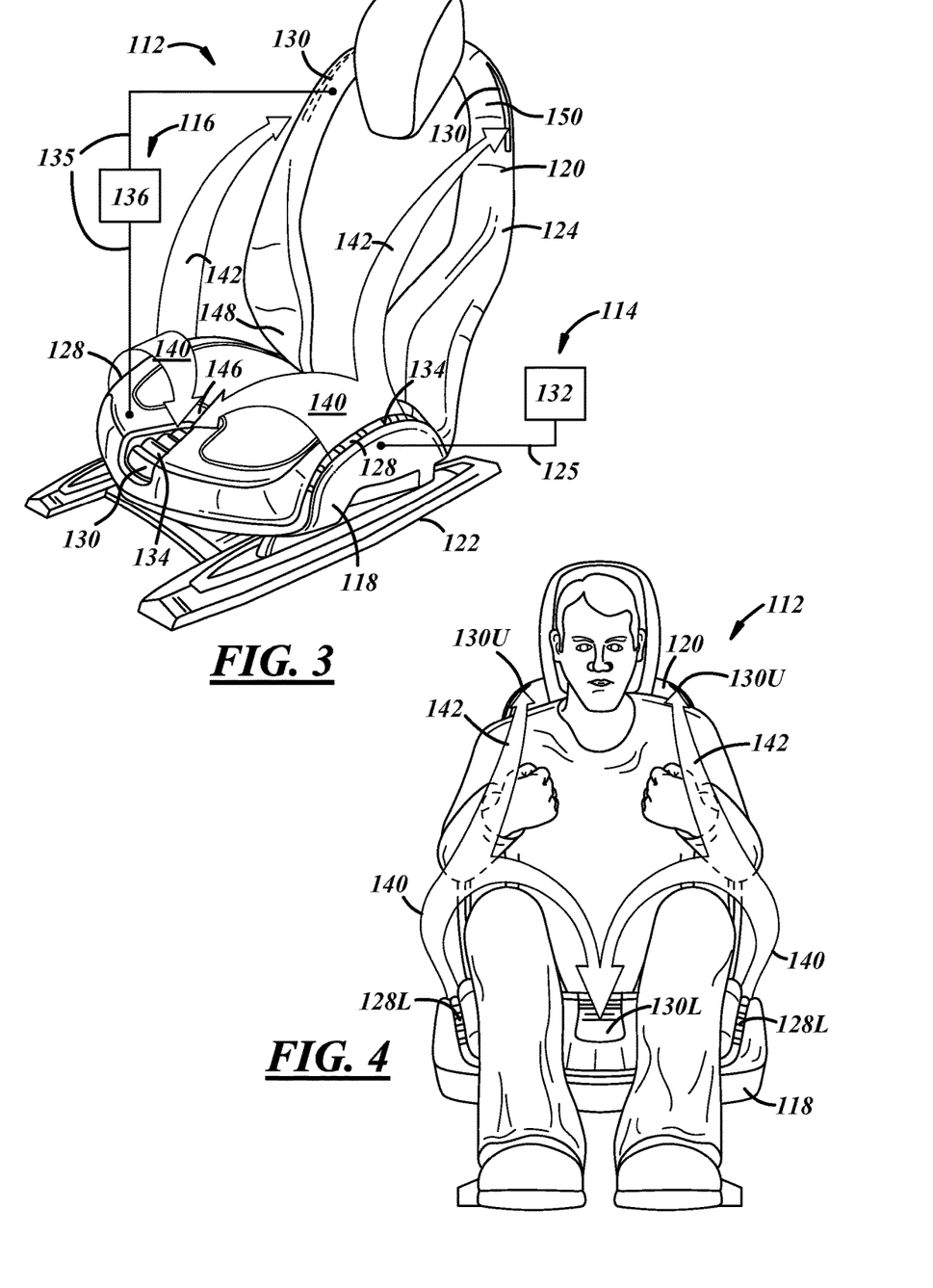
FIG. 3 is a perspective view of another embodiment of the vehicle seat.
FIG. 4 is a front view of the vehicle seat of FIG. 3, shown with a seated passenger.
Figure 5:
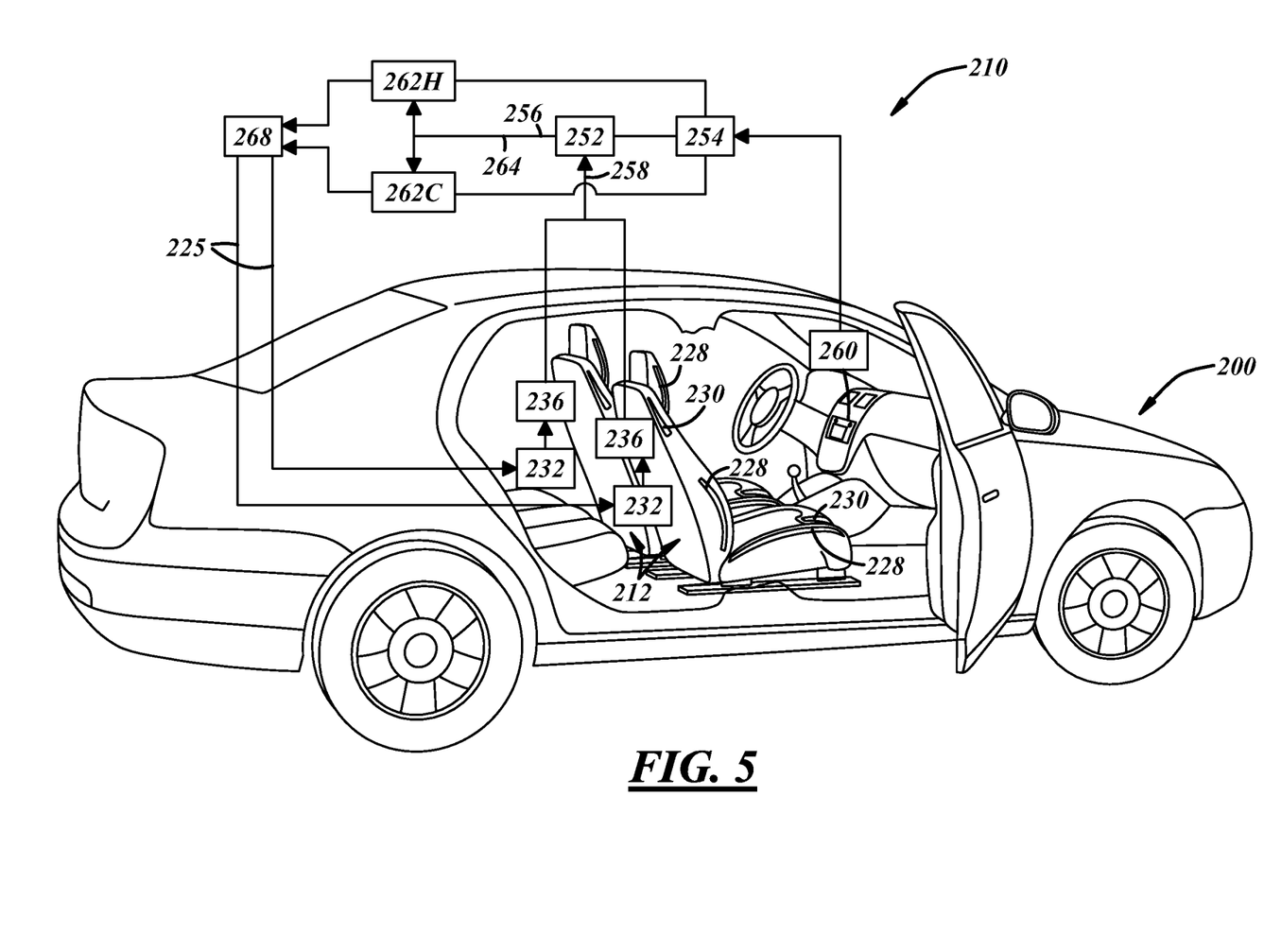
FIG. 5 is a perspective view of a vehicle equipped with one embodiment of an airflow management system.

One embodiment of a vehicle seat 12 is described in conjunction with FIGS. 1 and 2. The vehicle seat 12 includes an air discharge system 14 and an air intake system 16. The air discharge system 14 and air intake system 16 cooperate to create, move, and guide streams of air around a passenger sitting in the vehicle seat to provide a vehicle seat-specific climate so that passenger comfort can be optimized and energy use can be minimized. Another embodiment of the vehicle seat 112 having a differently configured air discharge system 114 is shown in FIGS. 3 and 4. An airflow management system 210 is shown in FIG. 5 and includes first and second vehicle seats 212 along with other components that allow for a vehicle seat-specific climate to be independently established with respect to each vehicle seat and seated passenger.

Referring now to FIG. 1, the illustrated vehicle seat 12 includes a seat bottom 18 and a seat back 20. The seat bottom 18 is adapted for attachment to a vehicle frame 22 and may be configured to move back and forth relative to the vehicle frame to accommodate passengers of various sizes sitting on the seat bottom 18. The seat back 20 is coupled to the seat bottom 18 and arranged to extend in an upward direction away from the seat bottom 18. The illustrated seat back 20 includes a backrest 24 and a headrest 26. The backrest 24 is coupled to the seat bottom 18 and adapted to support the back of a seated passenger. The optional headrest 26 is coupled to the backrest 24 and is adapted to support the back of the head of the seated passenger. The backrest 24 may be configured to pivot back and forth relative to the seat bottom 18. The headrest 26 may be configured to move up and down relative to the backrest 24. Together, the backrest 24 and headrest 26 may be adjusted to accommodate passengers of various sizes sitting on the vehicle seat 12.

The vehicle seat 12 also includes one or more air discharge ports 28 and one or more air intake ports 30. Each air discharge port 28 is an opening located along the outside of the vehicle seat 12 and in fluid communication with a positive pressure air source 32. The positive pressure air source 32 is shown schematically here and is any volume of air that can be or is pressurized to a pressure higher than the ambient cabin pressure to cause air to be discharged from the discharge port(s) with which it is in fluid communication. The air source 32 may be at least partly defined by duct work or conduits located within the vehicle seat 12 and hidden from view. Alternatively, the positive pressure air source 32 may be a source in fluid communication with the discharge port(s) 28 via separate conduits or passageways 25 located within the seat 12 and shown schematically in FIG. 1. The air source 32 may be pressurized by a fan, pump, or other device that is either part of the vehicle seat 12 or separate from the vehicle seat. The air discharge port(s) 28 and the positive pressure air source 32 may together at least partly define the air discharge system 14. Flow directors or fins 34 may be included at each discharge port 28 and configured to help direct discharged air in the desired direction. The fins 34 may or may not be adjustable by a user or by a controller. Each discharge port 28 may be in fluid communication with a common positive pressure air source 32, or one or more of the discharge ports can be in fluid communication with a dedicated positive pressure air source.

Likewise, each air intake port 30 is an opening located along the outside of the vehicle seat 12 and in fluid communication with a negative pressure source 36. The negative pressure source 36 is shown schematically here and is any volume of air that can be or is reduced in pressure to a pressure lower than the ambient cabin pressure to cause air to be drawn into the intake port(s) with which it is in fluid communication. The negative pressure source 36 may be at least partly defined by duct work or conduits located within the vehicle seat 12 and hidden from view. Alternatively, the negative pressure source 36 may be in fluid communication with the intake port(s) 30 via separate conduits or passageways 35 located within the seat 12 and shown schematically in FIG. 1. The negative pressure source 36 may be depressurized by a fan, pump, or other device that is either part of the vehicle seat 12 or separate from the vehicle seat. The air intake port(s) 30 and the negative pressure source 36 may together at least partly define the air intake system 16. Flow directors or fins 34 may be included at each intake port 30 and configured to help draw air into the intake port from the desired direction. The fins 34 may or may not be adjustable by a user or by a controller. Each intake port 30 may be in fluid communication with a common negative pressure source 36, or one or more of the intake ports can be in fluid communication with a dedicated negative pressure source.

Each of the discharge and intake ports 28, 30 may be located and arranged so that at least some of the air discharged from the discharge port(s) flows over, along, and/or around a portion of the body of the seated passenger and into the intake port(s). As described in the following examples, the vehicle seat 12 may provide different streams of air along different portions of the seated passenger's body. These streams of air may be useful to provide thermal comfort to the seated passenger and to provide and maintain a vehicle seat-specific climate in the area immediately around and about the vehicle seat, particularly at the passenger seating area of the seat.

In the particular example of FIG. 1, the air discharge system 14 and air intake system 16 cooperate to establish multiple streams of air, including lower streams 40, medial streams 42, and upper streams 44, each stream being named for its relative location with respect to the other streams. The lower streams of air 40 include air discharged from a pair of the discharge ports 28 located along the seat bottom 18 and drawn into the intake port 30 located along the seat bottom. More specifically, in this example, the pair of discharge ports 28 from which the lower streams of air 40 originate includes left and right discharge ports located along the left and right sides the seat bottom 18 so that the individual discharge ports of the pair are on opposite sides of the seat 12 and of the seated passenger. The intake port 30 in this example is located along a front portion 46 of the seat bottom 18 so that air flows along the legs of the seated passenger. More specifically, the illustrated intake port 30 is centrally located along the front portion 46 of the seat bottom 18 so that it is located between the legs of the seated passenger. With reference to the front view of the vehicle seat 12 in FIG. 2, each of the lower streams of air 40 flows from the pair of discharge ports (designated here as lower discharge ports 28L) located along the seat bottom 18, over a leg of the seated passenger, and into the intake port (designated here as lower intake port 30L), also located along the seat bottom.

The medial streams of air 42 in this example include air discharged from another pair of discharge ports 28 (designated medial discharge ports 28M in FIG. 2) located along the seat back 20 and drawn into a respective pair of intake ports 30 (designated intake ports 30U in FIG. 2) also located along the seat back. More specifically, in this example, the pair of discharge ports 28 from which the medial streams of air 42 originate includes left and right discharge ports located along opposite left and right sides of a lower portion 48 of the seat back 20 of the seat 12 and of the seated passenger. The pair of intake ports 30 associated with the medial streams of air 42 includes left and right intake ports located along opposite left and right sides of an upper portion 50 of the seat back 20 and of the seated passenger so that air flows along the torso of the seated passenger. More specifically, the illustrated discharge and intake ports 28, 30 associated with the medial streams of air 42 are respectively located to be generally aligned with the waist and shoulders of the seated passenger. With reference to FIG. 2, each of the medial streams of air 42 flows from one of the pair of medial discharge ports 28M located along the seat back 20, along the torso of the seated passenger, and into one of the pair of upper intake ports 30U located along the seat back.

The upper streams of air 44 in this example include air discharged from another pair of discharge ports 28 (designated upper discharge ports 28U in FIG. 2) located along the seat back 20 and drawn into a respective pair of intake ports 30 (designated upper intake ports 30U in FIG. 2) also located along the seat back. More specifically, in this example, the pair of discharge ports 28 from which the upper streams of air 44 originate includes left and right discharge ports located along the left and right sides of the headrest 26 and of the head of the seated passenger. The pair of intake ports 30 associated with the upper streams of air 44 includes left and right intake ports located along opposite left and right sides of the upper portion 50 of the seat back 20 and of the seated passenger so that air flows along the head and/or shoulders of the seated passenger. More specifically, the illustrated discharge and intake ports 28, 30 associated with the upper streams of air 44 are respectively located to be generally aligned with the head and shoulders of the seated passenger. In this particular example, the medial and upper streams of air 42, 44 flow from different pairs of discharge ports 28 and into the same pair of intake ports 30. With reference to FIG. 2, each of the upper streams of air 44 flows from one of the pair of upper discharge ports 28U located along the headrest 26, along the head and/or shoulders of the seated passenger, and into one of the pair of upper intake ports 30U located along the seat back 18.

FIG. 3 illustrates another embodiment of the vehicle seat 112. The air discharge system 114 in this example includes only one pair of discharge ports 128, while the air intake system 116 includes intake ports similar to those shown in FIGS. 1 and 2. In the particular example of FIG. 3, the air discharge system 114 and air intake system 116 cooperate to establish multiple streams of air, including lower streams 140 and upper streams 142, each stream being named for its relative location with respect to the other streams. The lower streams of air 140 include air discharged from a pair of discharge ports 128 located along the seat bottom 118 and drawn into the intake port 130 located along the seat bottom. More specifically, in this example, the pair of discharge ports 128 from which the lower streams of air 140 originate includes left and right discharge ports located along opposite left and right sides of the seat bottom 118 and of the seated passenger. The intake port 130 in this example is centrally located along the front portion 146 of the seat bottom 118 as in the previous example. With reference to FIG. 4, each of the lower streams of air 140 flows from one of the pair of discharge ports 128, over the leg of the seated passenger, and into the intake port, designated here as the lower intake port 130L.

The upper streams of air 142 in this example include air discharged from the same pair of discharge ports 128 and drawn into a respective pair of intake ports 130 located along the seat back. In this example, the pair of intake ports 130 (upper intake ports 130U in FIG. 4) associated with the upper streams of air 142 includes left and right intake ports located along opposite left and right sides of the upper portion 150 of the seat back 120 and of the seated passenger so that air flows along the torso of the seated passenger. As shown, the illustrated discharge and intake ports 128, 130 associated with the upper streams of air 142 may be respectively located to be generally aligned with the hips and shoulders of the seated passenger. With reference to FIG. 4, each of the upper streams of air 142 flows from one of the discharge ports 128, along the torso of the seated passenger, and into one of the upper intake ports 130U. In this example, where the air streams 140, 142 all originate from the same pair of discharge ports 128, some of the discharged air is directed toward the lower intake port 130L, and some of the discharged air is directed toward the upper intake ports 130U. The discharged air may be distributed in these different directions by the configuration of fins 134 or by other means such as the direction or orientation of conduits or passageways located inside the seat.

FIG. 5 illustrates an embodiment of an airflow management system 210. The airflow management system 210 may be installed in and included as part of a vehicle 200 as shown. The airflow management system 210 may be configured to independently establish first and second vehicle seat-specific climates around or with respect to first and second vehicle seats 212, such as those described above. The airflow management system 210 includes at least one vehicle seat 212, a blower 252, and a controller 254 adapted to control the blower and/or other system components. The vehicle seat(s) 212 include air discharge ports 228 located to be on opposite sides of the seated passenger and air intake ports 230 located to be on opposite sides of the seated passenger. In the illustrated example, the vehicle seats 212 are similar to the vehicle seat 12 shown in FIGS. 1 and 2, with three pair of discharge ports 228, a centrally located intake port along the seat bottom, and a pair of intake ports along the seat back. The blower 252 is shown schematically in FIG. 5 and includes an output side 256 and an opposite input side 258, where air flows through the blower from the input side to the output side. The output side 256 is in fluid communication with the air discharge ports 228 of the seat(s) 212 and is arranged to provide air flow out of the discharge ports. The blower 252 pressurizes the positive pressure air source 232, or the blower and the positive pressure air source may be considered one and the same with the blower in fluid communication with the discharge ports 228 via conduits or passageways 225, also shown schematically in FIG. 5.

Each seat 212 may include a built-in blower 252, or the blower may be located separately from the seat(s). For example, the blower 252 may be shared with other vehicle systems such as an HVAC system used to control the climate of other portions of the vehicle, to defrost vehicle windows, etc. In the illustrated example, the output side 256 of the blower 252 pressurizes the positive pressure air source(s) 232 and the input side 258 of the same blower depressurizes the negative pressure source(s) 236. The system 210 may include more than one blower 252, as well. In this example, the system 210 includes a manifold 268 that divides air flow from a single blower 252 to be distributed to first and second vehicle seats 212. An additional manifold may be provided at the input side 258 of the blower 252 so that a single blower can depressurize more than one negative pressure source 236.

The controller 254 controls the blower(s) 252 and/or other system components.

For example, the controller 254 may regulate the speed of a blower fan or turbine to increase, decrease, or maintain the flow rate of air through the blower, the pressure of the air source 232, and/or the pressure of the negative pressure source 236. The controller 254 may control the blower 252 based at least partly on user input communicated to the controller via a user interface 260, which is any component a user (e.g. a vehicle occupant) uses to interact with the system 210. The user interface 260 is capable of receiving information from the user about the desired airflow characteristics with respect to one or more vehicle seats 212 and/or communicating information to the user (e.g. the present airflow characteristics). The user interface 260 may include a button, lever, knob, dial, touch screen, microphone, or other device and may be attached as part of the vehicle seat 212, attached as part of some other vehicle component such as an instrument panel, or may be physically separate from other system 210 components (e.g., a smart phone, tablet computer, etc.). The controller 254 may be the vehicle ECU or some other electronic controller capable of receiving information from the user interface or other sources and controlling the blower 252 and/or any other system component in response. Such an electronic controller may be programmed or programmable and may also be capable of processing information. For example, the controller 254 may receive information via the user interface 260 about the desired temperature of the air to be discharged from the discharge ports 228, and the information may be in some other form than a numerical desired temperature. For instance, a user may indicate that the desired temperature is less than the current temperature. The controller 254 may be capable of processing the information and acting on it, such determining the current temperature and setting a new temperature set-point below the current temperature. Another example of a user interface/controller pairing includes a knob or dial as the user interface 260 paired with a rheostat as the controller 254, where the user interacts with the system 210 via the knob or dial and the rheostat controls the power supplied to the blower 252 or other component in response.

The system 210 may also include one or more heat exchangers 262. Examples of heat exchangers 262 include an air heating unit 262H and an air cooling unit 262C. Each heat exchanger 262, shown schematically in FIG. 5, is arranged along a system airflow path 264 to heat and/or cool the air that flows thereby. For example, one or more heat exchangers 262 may be located between the output side 256 of the blower 252 and the discharge port(s) 228, along or within the positive pressure air source 232, for example. The heat exchanger(s) 262 may alternatively or additionally be located between intake port(s) 230 and the input side 258 of the blower 252, along or within the negative pressure source 236, for example. The heat exchangers(s) 262 may be controlled by the controller 254. For example, the heat exchanger 262H may be an electric resistance heater, and the controller 254 may monitor the air temperature at some point along the flow path 264 and cycle the heater off and on as necessary to achieve the desired air temperature. An air-cooling heat exchanger 262C may be controlled similarly. For example, the controller may cycle a refrigerant compressor of the air-cooling unit off and on as necessary. The controller 254 may also be configured to control the movement and/or position of baffles or other flow restrictors to selectively route airflow around one or more of the heat exchangers 262 as another manner of affecting the temperature of the air along the flow path 264. Where more than one heat exchanger 262 is employed, they may be arranged along the system air flow path 264 in parallel as shown in FIG. 5 or in series or in some combination thereof.

The airflow management system 210 of FIG. 5 includes first and second vehicle seats 212, each coupled to the frame of the vehicle 200 in spaced-apart relation. Each of the seats 212 may be configured like those in any of FIGS. 1-4 or in some other manner. The user interface 260 is also coupled to the vehicle 200 as part of an instrument panel, in this example. The user interface 260 is located and configured to provide information to passengers sitting on the vehicle seats 212 and to receive commands or other input from the passengers. For example, the user interface 260 may allow first and second passengers seated on the vehicle seats 212 to provide separate pieces of information to the system 210 regarding the desired airflow characteristics or seat-specific climate of their individual seats. Each passenger may thus establish different vehicle seat-specific climates. The first passenger may use the user interface 260 to cause relatively cold air to be provided to the first vehicle seat, and the second passenger may use the same user interface or a different user interface to cause relatively warm air to be provided to the second vehicle seat.

The controller 254 is in communication with the blower 252, the user interface 260, and the heat exchangers 262, which in this case include an air-cooling unit 262C and an air-heating unit 262H. The controller 254 may also be in communication with other components, such as a thermocouple or pressure transducers along the air flow path 264 or actuators at the manifold 268 configured to selectively restrict air flow along some portion or portions of the air flow path. The controller 254 may be capable of controlling any number of system components to achieve the desired air flow characteristics associated with any number of individual vehicle seats. Examples of airflow characteristics that may be user-selected, monitored, and/or affected by the system 210 via operation of the controller 254 include air temperature, air speed, air flow rate, air moisture content, and particulate content, to name a few. For example, an air-cooling unit including an evaporator coil may be under the control of the controller 254 to remove moisture from the air along the air flow path 264.

Overall energy consumption may be lessened or minimized as a result of each vehicle seat being capable of providing its own vehicle seat-specific climate. In one example, a passenger is seated on one vehicle seat 212 and is alone in the vehicle 200. The passenger may desire warmth and use the user interface 260 to cause heated air to be discharged from the seat 212 and along at least some portion of his body. Since the heated air is provided as part of the vehicle seat-specific climate, only about one-quarter of the space in vehicle cabin is heated to provide the passenger with the desired warmth.

In another embodiment, each vehicle seat 212 restraint may be controlled by an individual user interface 260 and controller 254 controlling a vehicle seat-specific blower 252, manifold 268, and heat exchanger(s) 262. The user interface 260 may be mounted to the vehicle seat 212 along with an on-board controller 254. In another embodiment, the user interface 260 and controller 254 are configured to control each vehicle seat-specific blower 252, manifold 268, and heat exchanger(s) 262. In yet another example, one or more negative pressure source 236 may be depressurized by a separate blower from the blower 252 that pressurizes the positive pressure air source 232. For example, one blower may have its output side in fluid communication with the positive pressure air source 232 and its input side in fluid communication with the environment outside of the passenger cabin, and another different blower may have its input side in fluid communication with the negative pressure source and its output side in fluid communication with the environment outside the passenger cabin.

In another example, the user interface 260 may be included on a digital device remote from the vehicle 200 or vehicle seat(s) 212. The digital device may be a smart phone, tablet computer, personal computer, etc. The user interface 260 may communicate commands via a wired or wireless network to the controller 254 to control the various components of the vehicle airflow management system 210. The controller 254 may be part of the central control system of the vehicle 200 or a component included in the vehicle seat(s) 212.

The above-described vehicle seats and airflow management system can help to reduce or minimize the amount of time required for the seated passenger to feel the desired thermal sensation, be it a heating sensation or a cooling sensation. This is a result of developing the vehicle seat-specific climate localized at the vehicle seat. The seat-specific climate has less volume compared to the volume of the interior of the vehicle passenger cabin. As a result, less energy is required to change the temperature of the air in the seat-specific climate. The vehicle seat-specific climate may be a thought of as a plume or cocoon of conditioned air around the passenger. In some cases, about 80% or more of the body of the seated passenger may be covered by the streams of conditioned air.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle seat, comprising:
a seat bottom adapted for mounting to a vehicle;
a seat back coupled to the seat bottom;
a first pair of air discharge ports in fluid communication with a positive pressure air source and located along opposite left and right sides of the seat bottom and of a passenger seating area of the seat;
a second pair of air discharge ports located along opposite left and right sides of the seat back and of the passenger seating area;
an air intake port located along a front portion of the seat bottom; and
a pair of air intake ports located along the opposite left and right sides of the seat back,
wherein each of the air intake ports is in fluid communication with a negative pressure source and located along the passenger seating area,
wherein the air intake port located along the front portion of the seat bottom cooperates with the first pair of air discharge ports to form and guide lower streams of air that flow along legs of a passenger when the passenger is seated at the passenger seating area, each of the lower streams of air originating at one of the first pair of air discharge ports and extending to the air intake port located along the front portion of the seat bottom, and
wherein the pair of air intake ports located along the opposite left and right sides of the seat back cooperates with the second pair of air discharge ports to form and guide additional streams of air that flow along a torso of the passenger, each of the additional streams of air originating at one of the second pair of air discharge ports and extending to one of the pair of air intake ports located along the opposite left and right sides of the seat back,
wherein each of the air discharge ports is an opening located along an outer surface of the vehicle seat such that air is discharged directly into a passenger cabin of the vehicle from each discharge port.

2. A vehicle seat as defined in claim 1, further comprising a third pair of air discharge ports located along the opposite left and right sides of the seat back and of the passenger seating area,
wherein said additional streams of air that flow along the torso of the passenger are medial streams of air, and
wherein the third pair of air discharge ports cooperates with the pair of air intake ports located along the opposite left and right sides of the seat back to form upper streams of air that flow along the body of the seated passenger at a location above the medial streams of air.

3. A vehicle seat as defined in claim 2, wherein the seat back includes a headrest and one of the pairs of air discharge ports is located along the headrest.

4. A vehicle seat as defined in claim 1, wherein the lower streams of air include one stream of air originating at the air discharge port along the right side of the seat bottom and flowing from an outer side of a right leg and over the right leg toward an inner side of the right leg, and another distinct stream of air originating at the air discharge port along the left side of the seat bottom and flowing from an outer side of a left leg and over the left leg toward an inner side of the left leg, the two streams merging at the inner sides of the right and left legs to flow into the air intake port.

5. A vehicle seat as defined in claim 1, wherein each of the air discharge ports is located alongside and outside of the passenger seating area so that the body of the passenger does not obstruct the air discharge ports when seated in the passenger seating area.

6. A vehicle seat as defined in claim 1, wherein at least a portion of each of the streams of air flows in an upward direction.

7. An airflow management system for use in a vehicle, comprising:
a vehicle seat having air intake ports located along opposite left and right sides of an upper portion of a seat back of the seat, an air intake port located along a front portion of a seat bottom, and air discharge ports located along opposite left and right sides of the seat bottom;
a blower having an output side arranged to provide air flow out of the air discharge ports; and
a controller adapted to control the blower,
wherein the air discharge ports and air intake ports are arranged and cooperate to form multiple streams of air such that each stream of air flows along a distinct portion of the body of a passenger when the passenger is seated at a passenger seating area, each stream of air originating at one of the air discharge ports and extending to one of the air intake ports,
wherein the multiple streams of air include lower streams of air each originating at one of the air discharge ports located along the seat bottom and extending and flowing along a leg of the passenger into the air intake port located along the front portion of the seat bottom, and
wherein the multiple streams of air include additional streams of air extending and flowing along a torso of the seated passenger and into the air intake ports located along the upper portion of the seat back,
wherein each of the air discharge ports is an opening located along an outer surface of the vehicle seat such that air is discharged directly into a passenger cabin of the vehicle from each discharge port.

8. An airflow management system as defined in claim 7, wherein the blower has an input side arranged to draw air into the air intake ports.

9. An airflow management system as defined in claim 7, further comprising one or more heat exchangers located along a system air flow path to affect the temperature of the air flowing through the system.

10. An airflow management system as defined in claim 9, wherein the one or more heat exchangers includes an air-cooling unit and an air-heating unit.

11. An airflow management system as defined in claim 9, wherein the controller is adapted to receive information corresponding to desired system airflow characteristics and to control the one or more heat exchangers to achieve said airflow characteristics.

12. An airflow management system as defined in claim 7, wherein the controller is adapted to receive user input from a user interface that is part of the vehicle.

13. An airflow management system as defined in claim 7, wherein the controller is adapted to receive user input from a user interface that is separate from the vehicle.

14. An airflow management system as defined in claim 7, further comprising:
a second vehicle seat having air intake ports located along opposite left and right sides of a passenger seating area of the second seat and having air discharge ports located on the opposite left and right sides of the passenger seating area of the second seat, wherein airflow through the ports of the second vehicle seat is separately controllable from the airflow through the ports of the other vehicle seat.

15. A vehicle seat as defined in claim 7, wherein the lower streams of air include one stream of air originating at the air discharge port along the right side of the seat bottom and flowing from an outer side of a right leg of the passenger and over the right leg of the passenger toward an inner side of the right leg of the passenger, and another distinct stream of air originating at the air discharge port along the left side of the seat bottom and flowing from an outer side of a left leg of the passenger and over the left leg of the passenger toward an inner side of the left leg of the passenger, the two lower streams of air merging at the inner sides of the right and left legs of the passenger to flow into the air intake port.

16. A vehicle seat as defined in claim 7, wherein each of the air discharge ports is located alongside and outside of the passenger seating area of the seat so that the body of the passenger does not obstruct the air discharge ports when seated in the passenger seating area.

17. A vehicle seat as defined in claim 7, wherein at least a portion of each of the streams of air flows in an upward direction.

18. A vehicle seat, comprising:
a seat bottom adapted for mounting to a vehicle;
a seat back coupled to the seat bottom;
a first pair of air discharge ports in fluid communication with a positive pressure air source and located along opposite left and right sides of the seat bottom and of a passenger seating area of the seat;
a second pair of air discharge ports located along opposite left and right sides of the seat back and of the passenger seating area;
an air intake port located along a front portion of the seat bottom; and
a pair of air intake ports located along the opposite left and right sides of the seat back,
wherein each of the air intake ports is in fluid communication with a negative pressure source and located along the passenger seating area,
wherein the air intake port located along the front portion of the seat bottom cooperates with the first pair of air discharge ports to form and guide lower streams of air that flow along legs of a passenger when the passenger is seated at the passenger seating area, each of the lower streams of air originating at one of the first pair of air discharge ports and extending to the air intake port located along the front portion of the seat bottom, and
wherein the pair of air intake ports located along the opposite left and right sides of the seat back cooperates with the second pair of air discharge ports to form and guide additional streams of air that flow along a torso of the passenger, each of the additional streams of air originating at one of the second pair of air discharge ports and extending to one of the pair of air intake ports located along the opposite left and right sides of the seat back,
wherein at least a portion of each of the streams of air flows in an upward direction.

19. A vehicle seat as defined in claim 18, further comprising a third pair of air discharge ports located along the opposite left and right sides of the seat back and of the passenger seating area, wherein said additional streams of air that flow along the torso of the passenger are medial streams of air, and wherein the third pair of air discharge ports cooperates with the pair of air intake ports located along the opposite left and right sides of the seat back to form upper streams of air that flow along the body of the seated passenger at a location above the medial streams of air.

20. A vehicle seat as defined in claim 19, wherein the seat back includes a headrest and one of the pairs of air discharge ports is located along the headrest.

\* \* \* \* \*